United States Patent [19]

Borom et al.

[11] 3,872,731

[45] Mar. 25, 1975

[54] MINIATURIZED AUTOMATIC DECOMPRESSION COMPUTER

[75] Inventors: Marcus P. Borom; Lyman A. Johnson, both of Schenectady, N.Y.

[73] Assignee: General Electric Company, Schenectady, N.Y.

[22] Filed: Oct. 9, 1973

[21] Appl. No.: 404,435

[52] U.S. Cl............................................. 73/432 R
[51] Int. Cl...................... G01f 23/14, G06g 5/00
[58] Field of Search .............................. 73/432 R

[56] References Cited
UNITED STATES PATENTS

| | | | |
|---|---|---|---|
| 3,457,393 | 7/1969 | Stubbs et al................ | 73/432 R UX |
| 3,710,625 | 1/1973 | Borom et al................... | 73/432 R |
| 3,757,586 | 9/1973 | Borom.............................. | 73/432 R |
| 3,759,101 | 9/1973 | Borom et al..................... | 73/432 R |
| 3,759,109 | 9/1973 | Johnson et al................... | 73/432 R |
| 3,777,573 | 12/1973 | Alinari............................. | 73/432 R |

*Primary Examiner*—Richard C. Queisser
*Assistant Examiner*—Joseph W. Roskos
*Attorney, Agent, or Firm*—Charles T. Watts; Joseph T. Cohen; Jerome C. Squillaro

[57] ABSTRACT

In a decompression meter in which permselective membranes are used to simulate gas uptake and release by a diver's body tissues, pressure variations in the time-constant gas chambers are sensed, measured and indicated directly by mechanical means including pistons, levers and gears.

5 Claims, 5 Drawing Figures

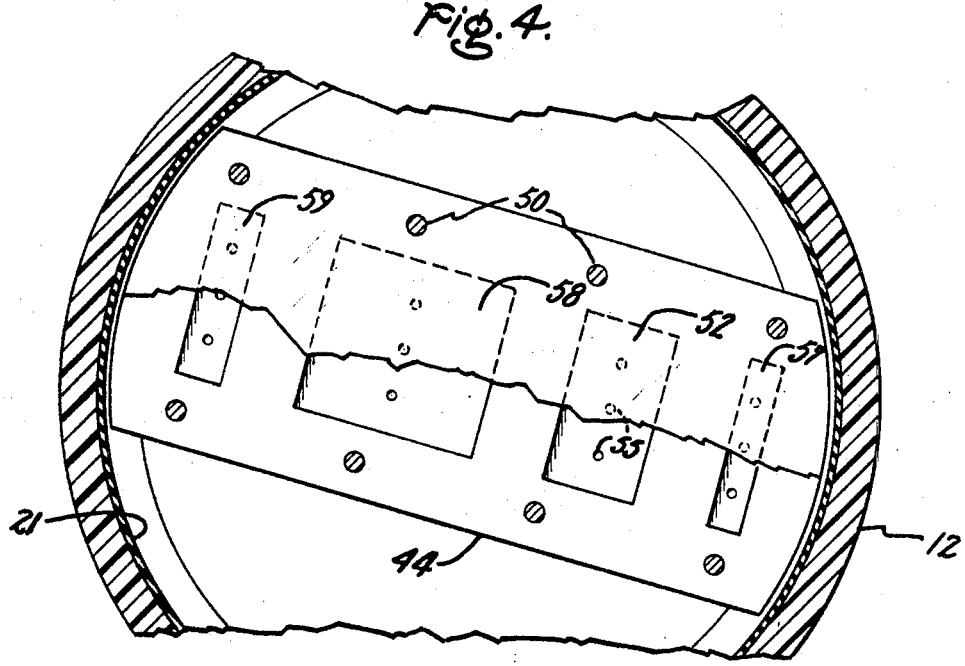
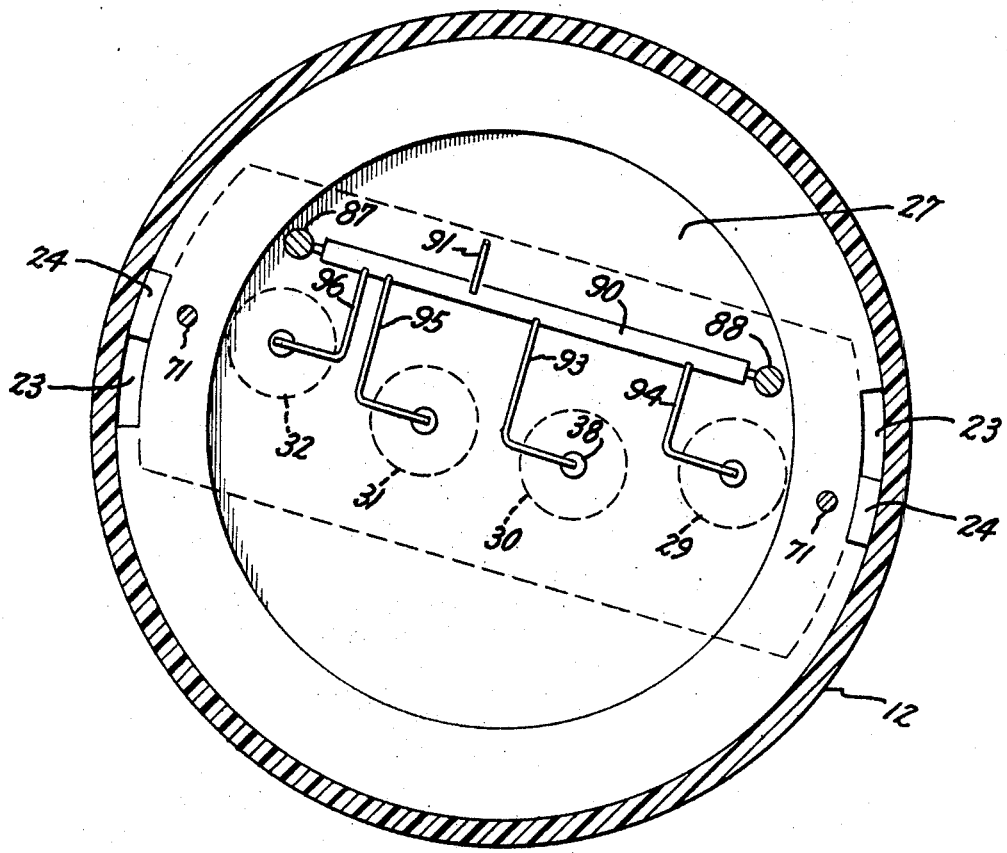

MINIATURIZED AUTOMATIC DECOMPRESSION COMPUTER

The present invention relates generally to the decompression computer art; and is more particularly concerned with a novel pneumatic analogue decompression instrument which continuously senses and computes and, through a mechanical assembly associated with the computing element, indicates a minimum duration safe decompression schedule.

BACKGROUND OF THE INVENTION

In our U.S. Pat. No. 3,710,625, granted Jan. 16, 1973, an automatic decompression computer in miniaturized form is disclosed and claimed. This instrument can be worn on one's wrist during scuba diving for measurement, computation and easy readout for guidance in returning to the surface with assurance that the danger of decompression "bends" will be avoided. Computation is accomplished by simulation of the gas-diffusion characteristics of the body tissues through the use of a suitable permselective membrane (as disclosed and claimed in U.S. Pat. No. 3,757,586), thus avoiding the error inherent in prior art devices relying upon Poiseuille flow for this purpose.

Miniaturization is accomplished principally through the use of an oil-filled bourdon tube, the oil serving as an incompressible pressure transducer in the gauge component of the instrument. This imposes critical requirements on the oil-filling operation and on permanently sealing against gas loss from the time-constant chamber into the oil-filled portion of the gauge.

SUMMARY OF THE INVENTION

The decompression instrument of this invention enables elimination of those critical gauge filling and sealing steps and offers additional significant advantages. Thus, for instance, the guaranteed useful life of the instrument is substantially increased by elimination of a liquid seal.

These results are obtained through the use of a mechanical assembly which replaces the bourdon tube and its oil fill and operates the indicator on the instrument dial through interacting piston, lever and gear means in response to pressure changes in the time-constant gas chamber. The advantages of small size and high precision of our patented instrument are retained in the instrument of this invention.

DESCRIPTION OF THE DRAWINGS

The novel features of this invention are illustrated in the drawings accompanying and forming a part of this specification, in which:

FIG. 4 is a view like that of FIG. 3 taken on line 4—4 of FIG. 1 indicating the effective area of each of the four membranes associated with the time-constant gas chambers; and FIG. 5 is another view like that of FIG. 3 taken on line 5—5 of FIG. 1 showing in plan view the four cylinders and pistons and the drive shaft and associated levers of the gauge assembly.

DETAILED DESCRIPTION OF THE INVENTION

Figure 1:
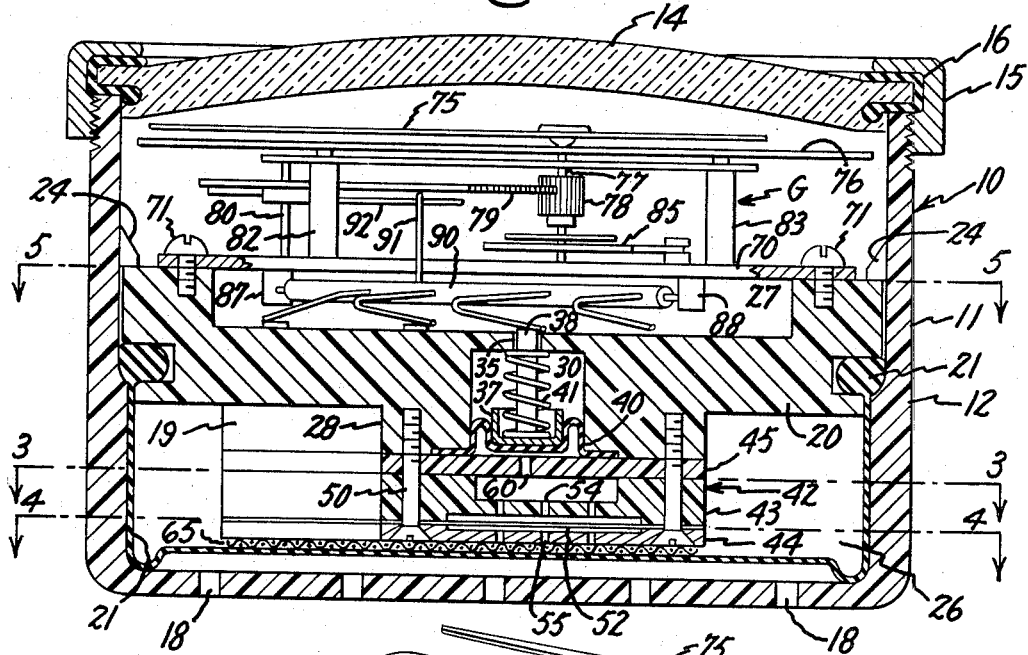
FIG. 1 is a view in vertical section of a decompression instrument embodying this invention in preferred form.

As illustrated in the drawings, self-contained instrument 10 is enclosed in a housing 11 comprising a cup-like body 12 suitably of plastic material (such as Lexan polycarbonate resin) and a glass cover 14 secured liquid-tightly to the lip of body 12 by a metal retainer ring 15 in threaded engagement with the lip portion of body 12. A seal 16 of resilient material such as natural rubber is disposed between ring 15 and cover 14 to protect the glass against breakage during assembly and to seal out water that might otherwise tend to leak between the parts, and to maintain the gauge chamber at a constant pressure independent of the ambient pressure. The bottom wall of body 12 is provided with a plurality of apertures 18 to admit water into the housing for operation of the instrument during diving excursions and to allow drainage of water from the housing on return of the diver to the surface.

Instrument 10 includes in addition as principal components computer assembly 19 and gauge assembly G supported on computer assembly 19 within the upper portion of housing 11.

Computer assembly 19 includes generally cylindrical metal block 20 fitting closely to the inner wall of housing 12 around its circumference and being liquid-tightly sealed thereto by means of the bead of rubber diaphragm 21 received in an annular recess in block 20 and urged against the wall of housing 11 as an O-ring seal. Diaphragm 21 loosely envelopes the lower end of block 20 and serves as a resilient inner bottom wall of housing 11 and together with block 21 provides ambient pressure gas chamber 26.

Block 21 is provided with two diametrically opposed peripheral slots 23 enabling insertion of block 21 in position in body 12 where it is retained in place by lugs 24 as the block is turned after insertion to the position shown in FIG. 5.

Figure 3:
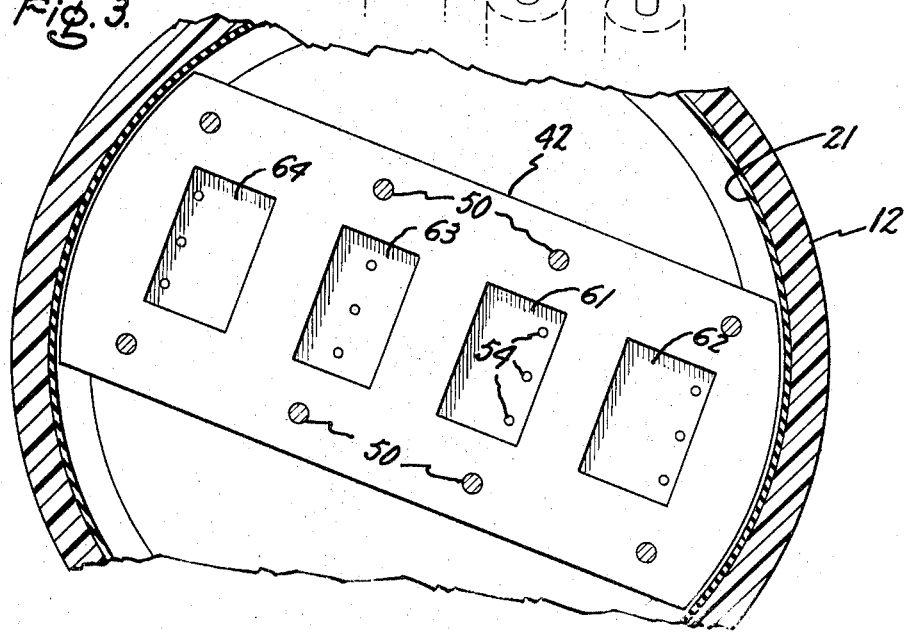
FIG. 3 is a horizontal sectional view taken on line 3—3 of FIG. 1 showing the locations and relative sizes of the four time-constant gas chambers.

The upper side of block 20 is provided with a cylindrical recess 27 and a projection 28 is formed on the lower side of the block and extends generally diametrically of the housing from one side to the other as indicated in FIGS. 1 and 3.

Four cylinders 29, 30, 31 and 32 (FIGS. 1, 2 and 5) are provided in block 20, each of these communicating with recess 27 through its respective smaller diameter aperture as illustrated at 35 in FIG. 1. Additionally, a piston is provided in each cylinder, as illustrated at 37 in FIG. 1. Piston 37 has a stem 38 which extends through opening 35 for reciprocating motion as the diver experiences varying pressure conditions in the course of his underwater excursion. A flexible rolling diaphragm 40 closes the lower end of cylinder 30, retaining piston 37 in its cylinder and sealing against fluid flow through the lower end of the cylinder. A compression spring 41 resiliently opposes upward motion of piston 37 as will be further described below.

Pressure chamber subassembly 42 of computer assembly 19 comprises a metal time-constant-chamber block 43, a metal membrane-retaining plate 44, and a metal diaphragm-retaining plate 45. These components are assembled as shown in FIG. 1 and secured together to block 20 by means of a plurality of screws 50 threaded into projection 28 of block 20. Block 43 and plates 44 and 45 are diametrically co-extensive with projection 28 of block 20. Blocks 42 and 43 are gastightly secured together by brazing. A permselective membrane 52 is shown in FIG. 1 as being disposed between the lower portion of block 43 and the upper portion of plate 44, each of which is apertured (at 54 and 55, respectively) and provided with a shallow recess to receive membrane support means (not shown) suitably in the form of polyethylene mesh.

Membranes 57, 58 and 59 similarly serving chambers 30, 31 and 32, respectively (FIG. 4), are fixed in place and supported by block 43 and plate 44. The four membranes are of different areal sizes for a purpose to be described, and are sealed gas tightly at the periphery of the shallow, area defining, membrane support recess.

An aperture 60 is formed in plate 45 as shown in FIG. 1 to permit gas flow from a time-constant chamber 61 into contact with diaphragm 40 and into chamber 30 as piston 37 is displaced under the pressure of gas in chamber 61. Similar apertures (not shown) in plate 45 serve the other three time-constant chambers 62, 63 and 64 of block 43 for actuation of the pistons in cylinders 30, 31 and 32.

A metal screen 65 is attached to the lower side of plate 44 to maintain space for air flow between diaphragm 21 and plate 44 when water pressure displaces the diaphragm, reducing the volume of ambient pressure gas chamber 26.

Figure 2:
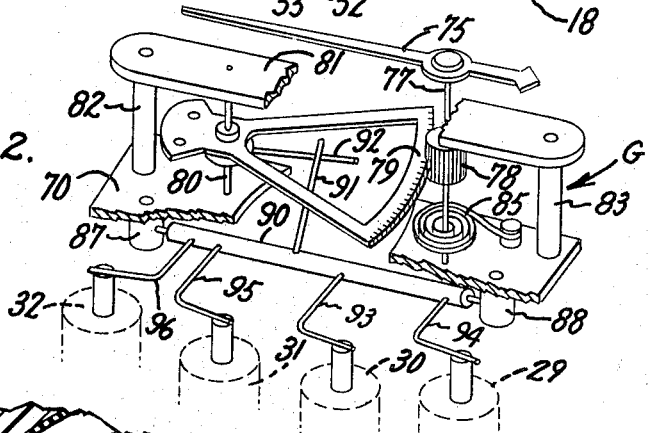
FIG. 2 is an enlarged perspective view of the mechanical gauge assembly of the instrument of FIG. 1, parts being broken away for clarity.

As shown to best advantage in FIG. 2, gauge assembly G is mounted on a metal base plate 70 secured to block 20 by means of screws 71. Indicator 75 is disposed above dial 76 (FIG. 1) fixed in position in the upper part of housing 11 so that both are readily visible through cover 14. Stem 77 supports indicator 75 and carries pinion gear 78 for driven engagement by rack 79 supported on vertical shaft 80 journaled in plate 70 and support bar 81 secured above plate 70 on pillars 82 and 83. Spring 85 anchored to support plate 70 is secured to shaft 77 to resiliently urge indicator 75 toward the 0 or "stop" position on the dial so that as ambient pressure of the instrument is reduced, pinion gear 78 will drive rack 79 as will subsequently be described in more detail.

Two journal blocks 87 and 88 secured to plate 70 extend downwardly into recess 27 and drive shaft 90 is supported by them for rotation relative to block 20 and the gauge assembly superstructure. Lever 91, fixed to shaft 90, extends upwardly to engage rack 79 and follower 92 to urge the rack in one direction or the other as shaft 90 is rotated in response to pressure fluctuations in one or another of time-constant chambers 61, 62, 63 and 64. Actuating levers 93, 94, 95 and 96 are likewise fixed to shaft 90 at spaced intervals along its length to engage piston stem 38 and those of the pistons of cylinders 29, 31 and 32, respectively, for movement as the pistons move. These levers consequently translate reciprocating piston motion into rotational (i.e., rocking) drive shaft motion. Lever 91 travel is thereby actuated reciprocally with rack 79 and pinion gear 78 is rotated with resulting indicator 75 movement on the axis of stem 77 relative to dial 76.

MODE OF OPERATION

When this instrument is taken underwater, water flows into the lower part of housing 12 through apertures 18 and diaphragm 21 is displaced, effectively reducing the volume of ambient pressure gas chamber 26 and compressing the gas therein and increasing the gas pressure applied to membranes 52, 57, 58 and 59. Gas diffuses through the membranes in amounts proportional to their relative areas (FIG. 4). Gas diffusing through the membranes flows through passages 54 into time-constant chamber 61 and likewise reaches the chambers served by the other three membrane elements. As gas pressure increases in the time-constant chambers, diaphragm 40 is displaced and piston 37 of cylinder 29 is moved upwardly and the diaphragms and pistons of the other three cylinders are similarly actuated.

Membranes 52, 57, 58 and 59 are of suitable permselective material as set forth in U.S. Pat. No. 3,757,586 and each one is proportioned as to effective area according to the particular body tissue it is to simulate as to time constant gas uptake and release.

Tissue ratio is similarly incorporated in the computing function of the instrument, being in the characteristics of spring 41 and the springs serving the other three pistons. Thus, each of these four springs is selected as to spring constant according to the particular tissue ratio of the tissue represented as to time constant by the associated permselective membrane component of the instrument. Alternatively, the tissue ratio of each time constant chamber can be selected by appropriate choice as to the effective length of the actuating levers 93, 94, 95 and 96, the springs serving the four pistons then suitably having the same spring constant.

Because of the differences between the rates of increase of the gas pressure in the several time-constant chambers, one or another of the several pistons will at any given time be the driving element determining the position of drive shaft 90 and indicator 75. In similar manner as the diver brings the instrument up toward the water surface and the pressures in the time-constant chambers diminish in simulation of gas release of several different time-constant body tissues, one or another of the pistons will restrain the action of spring 85 in driving indicator 75 toward "stop" position. In other words, at all times during use, the instrument will indicate the limiting gas pressure condition in body tissues of the diver determining the decompression schedule to be followed for his safe return to the surface. Since there is no lost motion in the moving parts of gauge assembly G and instrument indicator 75 is coupled to actuating elements directly sensing continuously the gas pressure in the four time-constant chambers, there is no mechanical tolerance source of error in the operation of the instrument and the diver can therefore safely rely on its readings throughout the length of a dive. In other words, the instrument functions automatically continuously and can be relied upon to compute accurately the most complicated time and depth combinations.

What we claim as new and desire to secure by Letters Patent of the United States is:

1. A decompression meter for use in diving excursions which comprises,
   a. ambient pressure-sensing means including an ambient-pressure gas chamber;
   b. computer means comprising a time-constant gas chamber having a pressure port and a gas diffusion membrane separating the time-constant gas chamber from the ambient-pressure gas chamber for measuring continuously the uptake and release of gas of human tissues under fluctuating hyperbaric ambient pressures; and, c. indicator means including a gauge operatively associated with the computer means for indicating the appropriate decompression schedule in terms of hyperbaric pressures and time intervals, said gauge including an indicator and a mechanical assembly operative to actuate the indicator in response to fluctuation in gas pressure in the time-constant gas chamber comprising,
1. pressure-responsive means comprising a resilient diaphragm fluid-tightly closing the time-constant gas chamber pressure port and a piston for reciprocating motion toward and away from the time-constant gas chamber in response to changes in gas pressure in the time-constant gas chamber,
2. gear means including a pinion gear fixed to the indicator and a rack in driving engagement with the pinion gear,
3. lever means in driving engagement with the rack and driven engagement with the pressure-responsive means.

2. The decompression meter of claim 1 in which the lever means consists of a drive shaft, a first lever fixed to the drive shaft and extending therefrom and a second lever fixed to the drive shaft and engaging the rack, and in which the piston of the pressure-responsive means has a stem in contact with the first lever for moving the first lever and rotating the drive shaft when gas pressure in the time-constant chamber is increased.

3. The decompression meter of claim 1 in which the computer means comprises a plurality of time-constant gas chambers, and in which a separate pressure-responsive means is provided to serve each individual time-constant gas chamber.

4. The decompression meter of claim 1 in which the pressure responsive means includes a compression spring engaging and resiliently opposing motion of the piston, said spring having a spring constant to represent the tissue ratio of the tissue to which the time-constant chamber is related.

5. The decompression meter of claim 1 in which the computer means comprises a plurality of time-constant gas chambers and in which a separate pressure-responsive means is provided to serve each individual time-constant gas chamber, and in which the lever means comprises separate actuating levers serving the separate individual pressure-responsive means, said actuating levers being of different effective lengths representing in each instance the tissue ratio of the tissue to which the corresponding time-constant gas chamber is related.

* * * * *